(12) United States Patent
Cai (10) Patent No.: US 8,848,888 B2
(45) Date of Patent: *Sep. 30, 2014

(54) CHARGING FOR LONG DURATION SESSIONS IN COMMUNICATION NETWORKS

(75) Inventor: Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 245 days.

This patent is subject to a terminal disclaimer.

(21) Appl. No.: 13/349,661

(22) Filed: Jan. 13, 2012

(65) Prior Publication Data

US 2012/0116938 A1 May 10, 2012

Related U.S. Application Data

(63) Continuation of application No. 11/850,562, filed on Sep. 5, 2007, now Pat. No. 8,126,124.

(51) Int. Cl.
| | |
|---|---|
| *H04M 11/00* | (2006.01) |
| *H04M 15/00* | (2006.01) |
| *G06Q 50/06* | (2012.01) |
| *G06Q 30/02* | (2012.01) |
| *G06Q 30/04* | (2012.01) |
| *G06Q 40/00* | (2012.01) |
| *H04L 12/14* | (2006.01) |

(52) U.S. Cl.
CPC ............ *H04L 12/1428* (2013.01); *G06Q 50/06* (2013.01); *G06Q 30/0284* (2013.01); *G06Q 30/04* (2013.01); *G06Q 40/10* (2013.01); *H04L 12/14* (2013.01); *H04L 12/1439* (2013.01)
USPC .................... 379/114.1; 370/389; 379/112.06; 379/114.03; 379/126; 379/127.05; 379/201.01; 455/405; 455/406; 705/32; 705/34; 709/224; 726/7; 726/22

(58) Field of Classification Search
CPC ...... H04M 15/00; H04M 11/00; G06Q 30/00; H02J 17/00
USPC ............. 370/389; 379/112.06, 114.04, 114.1, 379/114.14, 114.2, 114.28, 126, 127.05, 379/201.01, 114.03, 114.07, 114.16; 455/406, 405; 705/32, 34; 726/7, 22; 320/109; 709/224
See application file for complete search history.

(56) References Cited

U.S. PATENT DOCUMENTS

| | | | | |
|---|---|---|---|---|
| 5,677,945 | A * | 10/1997 | Mullins et al. ........... | 379/114.17 |
| 6,330,312 | B1 * | 12/2001 | Wright et al. ............ | 379/112.06 |
| 6,597,774 | B1 * | 7/2003 | Jennings et al. ......... | 379/114.07 |

(Continued)

*Primary Examiner* — Gerald Gauthier
(74) *Attorney, Agent, or Firm* — Duft Bornsen & Fettig, LLP (57) ABSTRACT

Communication networks and associated methods are disclosed that provide charging for long duration sessions. A charging data system of the communication network receives interim accounting request messages from a network element that is serving a session. The charging data system identifies interim timestamps for the interim accounting request messages, and stores the interim timestamps. After a time period during the long duration session, the charging data system generates a partial CDR. The charging data system then inserts duration information for the long duration session in the partial CDR based on the stored interim timestamps, and transmits the partial CDR to a correlation system. The correlation system may then calculate a total duration for the session based on the duration information in the partial CDR. Even if a start/stop timestamp is not available, the correlation system may estimate the total duration of the session based on the interim timestamps.

20 Claims, 4 Drawing Sheets

(56) References Cited

U.S. PATENT DOCUMENTS

| | | | |
|---|---|---|---|
| 6,665,387 B2 * | 12/2003 | Hannu | 379/114.16 |
| 6,873,617 B1 * | 3/2005 | Karras | 370/389 |
| 7,072,638 B2 * | 7/2006 | Benco et al. | 455/405 |
| 7,774,842 B2 * | 8/2010 | Mahone et al. | 726/22 |
| 7,940,904 B2 * | 5/2011 | Cai et al. | 379/114.28 |
| 7,971,237 B2 * | 6/2011 | Caslin et al. | 726/7 |
| 8,023,926 B2 * | 9/2011 | Cai et al. | 455/406 |
| 8,055,237 B2 * | 11/2011 | Jones et al. | 455/405 |
| 8,102,981 B2 * | 1/2012 | Cai | 379/114.14 |
| 8,126,124 B2 * | 2/2012 | Cai | 379/114.1 |
| 8,189,752 B2 * | 5/2012 | Cai | 379/127.05 |
| 8,605,874 B2 * | 12/2013 | Cai | 379/114.03 |
| 2003/0110252 A1 * | 6/2003 | Yang-Huffman | 709/224 |
| 2007/0036312 A1 * | 2/2007 | Cai et al. | 379/126 |
| 2007/0242816 A1 * | 10/2007 | Cai et al. | 379/127.05 |
| 2007/0280455 A1 * | 12/2007 | Cai | 379/201.01 |
| 2008/0130850 A1 * | 6/2008 | Bencheqroun et al. | 379/114.04 |
| 2008/0243655 A1 * | 10/2008 | Cai et al. | 705/34 |
| 2009/0034702 A1 * | 2/2009 | Cai | 379/114.2 |
| 2009/0060154 A1 * | 3/2009 | Cai | 379/127.05 |
| 2009/0063315 A1 * | 3/2009 | Cai | 705/32 |
| 2010/0257077 A1 * | 10/2010 | Cai et al. | 705/34 |
| 2010/0287079 A1 * | 11/2010 | Cai et al. | 705/34 |
| 2012/0116938 A1 * | 5/2012 | Cai | 705/34 |
| 2012/0202455 A1 * | 8/2012 | Cai | 455/406 |

* cited by examiner

CHARGING FOR LONG DURATION SESSIONS IN COMMUNICATION NETWORKS

RELATED APPLICATIONS

This non-provisional patent application is a continuation of U.S. patent application Ser. No. 11/850,562 filed on Sep. 5, 2007 now U.S. Pat. No. 8,126,124, which is incorporated herein by reference.

BACKGROUND OF THE INVENTION

1. Field of the Invention

The invention is related to the field of communications and, in particular, to providing charging for long duration sessions in communication networks.

2. Statement of the Problem

One type of communication network gaining popularity is an IP Multimedia Subsystem (IMS) network. As set forth in the 3$^{rd}$ Generation Partnership Project (3GPP), IMS provides a common core network having a network architecture that allows for various types of access networks. The access network between a communication device and the IMS network may be a cellular network (e.g., CDMA or GSM), a WLAN (e.g., WiFi or WiMAX), an Ethernet network, or another type of wireless or wireline access network. The IMS architecture is initially defined by the 3GPP to provide multimedia services to communication devices over an Internet Protocol (IP) network, as IP networks have become the most cost savings bearer network to transmit video, voice, and data. Service providers are accepting this architecture in next generation network evolution.

IMS networks and other multimedia/data type networks provide new and different issues not typically seen with traditional circuit-based networks. One such issue is long duration sessions. In a traditional circuit-based network, a typical voice call is relatively short, on the order of ten minutes or less. In an IMS network, data sessions for surfing the Internet, for watching IP TV, for playing online gaming, etc, may last much longer than a traditional voice call. For example, an online gaming session may last for multiple days. When long durations sessions are established over an IMS network, there may be problems associated with charging for the sessions.

To provide offline charging for a session in an IMS network, a network element, such as a Call Session Control Function (CSCF), an application server, etc, generates Diameter Accounting Request (ACR) messages during the session. The network element first generates an ACR(start) message at initiation of the session, such as responsive to receiving a SIP INVITE message for the session. The message format for an ACR message includes a timestamp AVP, which is a group AVP that includes a field for a service delivery start timestamp and includes a field for a service delivery stop timestamp. The network element identifies a start time for the session, and inserts a start timestamp into the service delivery start timestamp field of the ACR(start) message. The network element then transmits the ACR(start) message to a Charging Data Function (CDF).

After the session is established, the network element periodically transmits ACR(interim) messages to the CDF. The network element transmits the ACR(interim) messages to the CDF according to a pre-defined interval, such as every five minutes. If the network element detects that the session ends, such as by receiving a SIP BYE message, then the network element generates an ACR(stop) message. The network element identifies a stop time for the session, and inserts a stop timestamp into the service delivery stop timestamp field of the ACR(stop) message. The network element then transmits the ACR(stop) message to the CDF.

When the CDF first receives the ACR(start) message from the network element, the CDF sets a timer. If the CDF receives an ACR(stop) message from the network element before expiration of the timer, then the CDF generates a full Charging Data Record (CDR) for the session. The CDF then transmits the CDR to a Charging Gateway Function (CGF). The CGF correlates the full CDR with any other CDRs for the session, and transmits a full CDR to a billing system which charges for the session.

If the CDF does not receive an ACR(stop) message from the network element before expiration of the timer, then the session is considered a "long duration session" (i.e., the elapsed time of the session extends beyond the timer set by the CDF). Instead of generating a full CDR, the CDF generates a partial CDR for the session and transmits the partial CDR to the CGF. After transmitting the first partial CDR to the CGF, the CDF re-sets the timer and continues to receive ACR (interim) messages from the network element. If an ACR (stop) message is not received before the timer expires again, then the CDF generates a second partial CDR for the long duration session and transmits the second partial CDR to the CGF. If the CDF receives an ACR(stop) message from the network element, then the CDF generates the final partial CDR for the session, and transmits the final partial CDR to the CGF.

There may be instances where the CDF does not receive one or more ACR messages (start/interim/stop) from the network element. The ACR messages may not be received for a variety of reasons, such as network congestion, failure of one or more elements in the network, etc. As an example, the CDF may be able to identify that an ACR(start) message was not received if the CDF receives one or more ACR(interim) messages for the session. As another example, the CDF monitors how often an ACR(interim) message should be received from a network element. If an ACR(interim) message is not received during a defined time interval, then the CDF identifies that an ACR(interim) message is missing. When an ACR message is missing or is lost, the CDF generates an incomplete CDR for the session, and transmits the incomplete CDR to the CGF.

At some point for a long duration session, the CGF correlates the partial CDRs (and incomplete CDRs) for the session according to an IMS Charging Identifier (ICID) assigned to the session. The CGF may also calculate a total duration for the session. For instance, the CGF may identify the start timestamp for the session and identify the stop timestamp for the session. The CGF may then calculate the total duration for the session based on these two timestamps. The CGF generates a CDR for the long duration session that includes the total duration for the session, and transmits the CDR to a billing system to charge for the session.

There may be problems encountered when charging for a long duration session. According to present 3GPP standards, only the ACR(start) message and the ACR(stop) message include timestamps. The start and stop timestamps represent the only data that may be used to calculate a total duration for the session. If the CDF does not receive either or both of the start or stop timestamps in the ACR messages from the network element, then a total duration for the session cannot be calculated. As a result, the billing system is unable to charge for the session.

SUMMARY OF THE SOLUTION

The invention solves the above and other problems by identifying timestamps for interim accounting request messages (e.g., Diameter ACR(interim) messages) in addition to the start and stop accounting request messages. By having this additional time information for a session, a total duration for the session may still be calculated even if a start accounting request message or a stop accounting request message is missing or is lost. A service provider may thus be able to partially charge for a session instead of writing the entire session off as a loss.

In one embodiment of the invention, a network element of a communication network serves a long duration session. The network element is adapted to generate a start accounting request message for the long duration session, insert a start timestamp in the start accounting request message, and transmit the start accounting request message to a charging data system. The network element is also adapted to generate a stop accounting request message for the long duration session, insert a stop timestamp in the stop accounting request message, and transmit the stop accounting request message to the charging data system. In addition to the start timestamp and the stop timestamp, the network element is further adapted to generate interim accounting request messages for the long duration session, insert interim timestamps in the interim accounting request messages, and transmit the interim accounting request messages to the charging data system. Thus, the network element of this embodiment provides interim timestamps which is not provided by prior network elements.

In another embodiment, the charging data system of the communication network receives the interim accounting request messages for the long duration session from the network element. The charging data system identifies interim timestamps for the interim accounting request messages, and stores the interim timestamps such as in a database. After some time period during the session, the charging data system generates a partial CDR, and inserts duration information for the long duration session in the partial CDR based on the stored interim timestamps. For example, the charging data system may insert the interim timestamps in the partial CDR as the duration information. The charging data system may alternatively calculate an elapsed time for the long duration session based on at least the stored interim timestamps, and insert the elapsed time in the partial CDR. The charging data system may then transmit the partial CDR to a correlation system.

In another embodiment, the correlation system of the communication network receives the partial CDR for the long duration session from the charging data system, and possibly receives other partial CDRs. The correlation system identifies an end to the long duration session, and processes the duration information from the partial CDR to attempt to identify a start timestamp and a stop timestamp for the long duration session. If the start timestamp is not identified, then the correlation system identifies a first interim timestamp near the beginning of the long duration session. If the stop timestamp is not identified, then the correlation system identifies a second interim timestamp near the end of the long duration session. The correlation system then calculates a total duration for the long duration session based on the start timestamp or the first interim timestamp and based on the stop timestamp or the second interim timestamp.

As is evident from the above embodiments, charging for long duration sessions may be accomplished even if a start timestamp and/or a stop timestamp for a session is lost or is missing. According to these embodiments, interim timestamps are identified and stored for a session. When a total duration is calculated for the session, the interim timestamps may be used to calculate the total duration if the start or stop timestamp is missing. A service provider can thus charge an estimated amount for the session whereas before the service provider would not be able to charge at all for the session.

The invention may include other exemplary embodiments described below.

DESCRIPTION OF THE DRAWINGS

The same reference number represents the same element or the same type of element on all drawings.

DETAILED DESCRIPTION OF THE INVENTION

FIGS. 1-4 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
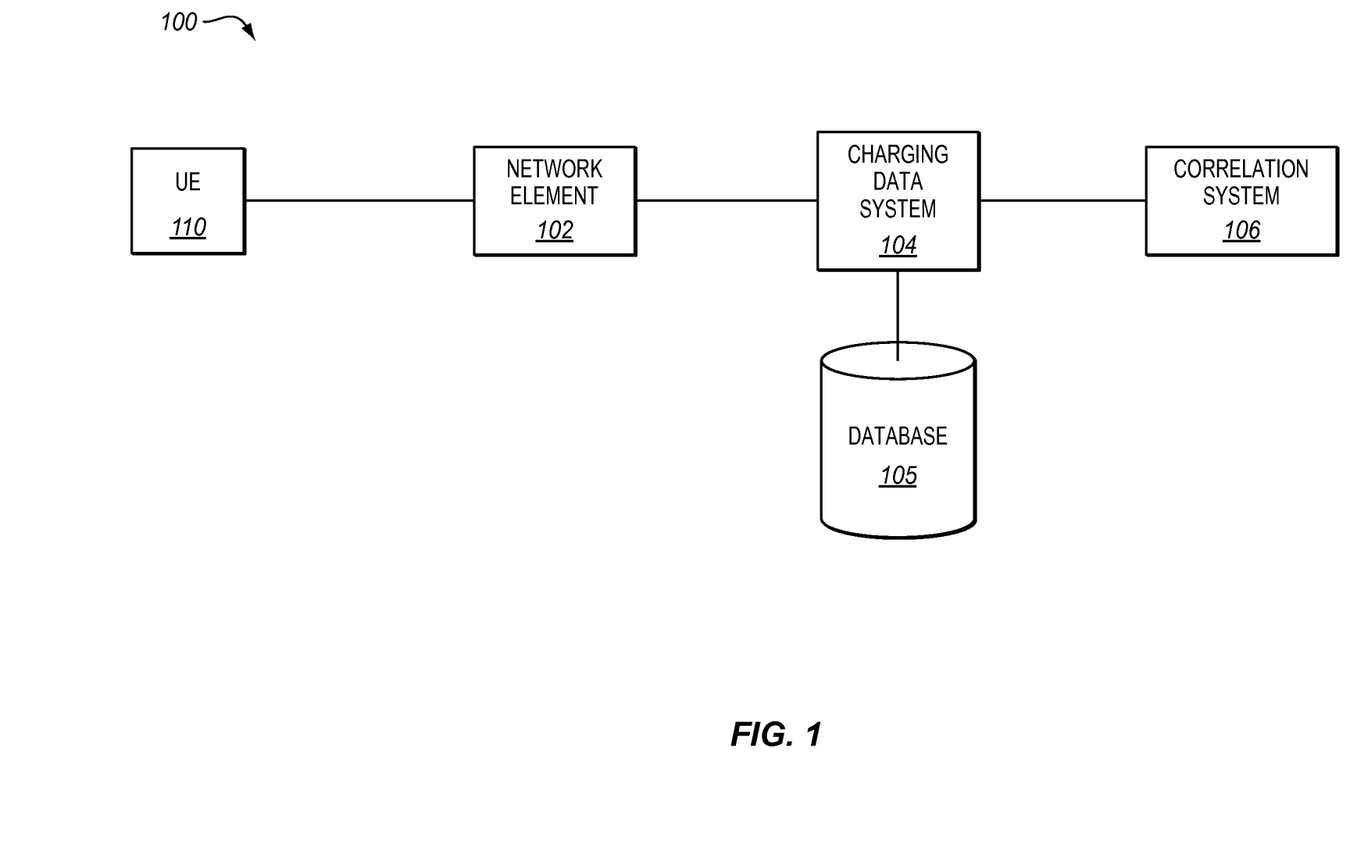
FIG. 1 illustrates a communication network in an exemplary embodiment of the invention.

FIG. 1 illustrates a communication network 100 in an exemplary embodiment of the invention. Communication network 100 may comprise an IMS network or another type of data communication network. Communication network 100 includes a network element 102, a charging data system 104, a database 105, and a correlation system 106. Network element 102 comprises any system, server, or function adapted to serve a session (also referred to as a call) over communication network 100. For example, in an IMS network, network element 102 may comprise a Call Session Control Function (CSCF), an application server (AS), or another type of element. Charging data system 104 comprises any system, server, or function adapted to receive accounting request messages from network element 102, and to generate Charging Data Records (CDR) for sessions over communication network 100. For example, in an IMS network, charging data system 104 may comprise a Charging Data Function (CDF) as defined by the 3GPP in Release 6, or a Charging Collector Function (CCF) as defined by the 3GPP in Release 5. Database 105 comprises any storage facility, internal or external, accessible by at least charging data system 104. Correlation system 106 comprises any system, server, or function adapted to process one or more CDRs for a session to determine total duration for a session. Correlation system 106 may be implemented in a Charging Gateway Function (CGF), in a CCF, in a billing system, or in another network element. Communication network 100 may include other networks, systems, or devices not shown in FIG. 1, such as additional network elements, additional charging data systems, and additional correlation systems.

Network element 102, charging data system 104, and/or correlation system 106 may comprise instructions executable by a processing system to operate as described above. Some examples of instructions are software, program code, and firmware. The instructions are operational when executed by the processing system to direct the processing system to operate in accordance with the invention. The term "processing system" refers to a single processing device or a group of inter-operational processing devices. Some examples of processors are computers, integrated circuits, and logic circuitry.

Assume for this embodiment that network element 102 serves a session involving user equipment (UE) 110. At the beginning of the session, such as responsive to receiving a SIP INVITE message for the session, network element 102 generates a start accounting request message. One example of a start accounting request message is a Diameter ACR(start) message. As previously described, an ACR message includes a timestamp AVP, which is a group AVP that includes a field for a service delivery start timestamp and includes a field for a service delivery stop timestamp. In a similar fashion, the start accounting request message in this embodiment includes a service delivery start timestamp field. Thus, network element 102 identifies a start time for the session, and inserts a start timestamp into the service delivery start timestamp field of the start accounting request message. Network element 102 then transmits the start accounting request message to charging data system 104.

Similarly, at the end of the session, such as responsive to receiving a SIP BYE message for the session, network element 102 generates a stop accounting request message. One example of a stop accounting request message is a Diameter ACR(stop) message. The stop accounting request message in this embodiment includes a service delivery stop timestamp field. Thus, network element 102 identifies a stop time for the session, and inserts a stop timestamp into the service delivery stop timestamp field of the stop accounting request message. Network element 102 then transmits the stop accounting request message to charging data system 104.

During the session, network element 102 periodically generates interim accounting request messages. One example of an interim accounting request message is a Diameter ACR (interim) message. As previously described, a Diameter ACR message only includes a service delivery start timestamp field and a service delivery stop timestamp field. However, the interim accounting request message may further include a service delivery interim timestamp field in one embodiment. Thus, when network element 102 generates an interim accounting request message, network element 102 may also identify an interim time for the session and insert an interim timestamp into the service delivery interim timestamp field of the interim accounting request message. Network element 102 then transmits the interim accounting request message to charging data system 104 according to the defined interval.

Figure 2:
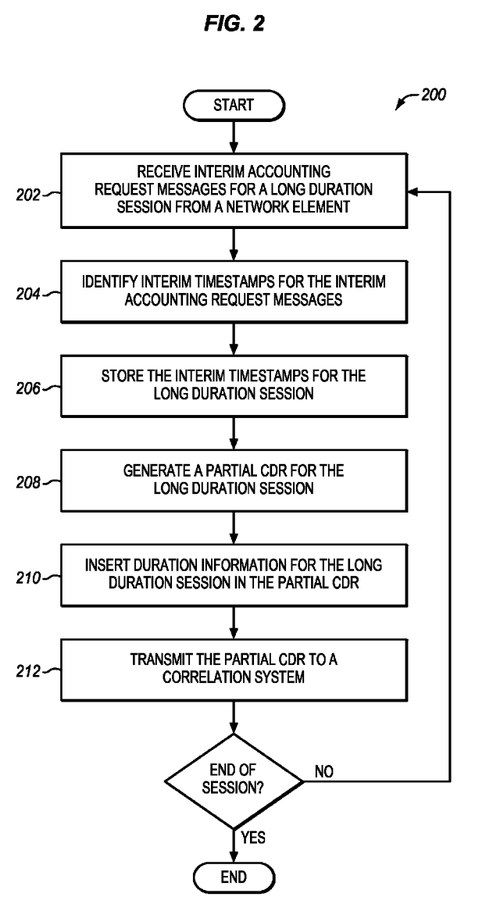
FIG. 2 is a flow chart illustrating a method of handling interim accounting request messages in an exemplary embodiment of the invention.

For the session, assume that charging data system 104 receives one or more of the start accounting request message and the interim accounting request messages from network element 102. FIG. 2 is a flow chart illustrating a method 200 of handling interim accounting request messages in charging data system 104 in an exemplary embodiment of the invention. The steps of method 200 will be described with reference to communication network 100 in FIG. 1. The steps of the flow chart in FIG. 2 are not all inclusive and may include other steps not shown.

In step 202, charging data system 104 receives the interim accounting request messages for the session from network element 102. The assumption herein is that the session comprises a long duration session. Charging data system 104 may also receive the start accounting request message from network element 102.

In step 204, charging data system 104 identifies interim timestamps for the interim accounting request messages. In one embodiment, network element 102 may insert an interim timestamp into a service delivery interim timestamp field of the interim accounting request message. Thus, charging data system 104 may identify an interim timestamp for an interim accounting request message by processing the service delivery interim timestamp field in the interim accounting request message. In another embodiment, charging data system 104 may access a local clock or timing mechanism responsive to receiving the interim accounting request message to define an interim timestamp for the interim accounting request message. Those skilled in the art will appreciate that charging data system 104 is adapted to adjust the local time used to define the interim timestamp based on different time zones, based on a service delivery time and the time of receipt of the interim accounting request message being offset, etc.

In step 206, charging data system 104 stores the interim timestamps for the session. Charging data system 104 may store the interim timestamps in database 105, which may be local to charging data system 104, or may be an external database that is shared with other network nodes, such as correlation system 106.

In step 208, charging data system 104 generates a partial Charging Data Record (CDR) for the session responsive to a triggering event. In one embodiment, the triggering event is expiration of a timer that charging data system 104 sets to determine when to generate a partial CDR. When the duration of the session extends beyond the timer maintained by charging data system 104, the session is considered a long duration session. The term "partial CDR" refers to a partial CDR as defined by the 3GPP, an incomplete CDR as defined by the 3GPP, or any other CDR that is not full or complete.

In step 210, charging data system 104 inserts duration information for the long duration session in the partial CDR based on the stored interim timestamps. For the duration information, charging data system 104 may insert one or more of the stored interim timestamps in the partial CDR. The interim timestamps inserted in the partial CDR will allows downstream elements, such as correlation system 106 or a billing system (not shown in FIG. 1) to calculate a total duration for the session. Alternatively for the duration information, charging data system 104 may calculate an elapsed time for the session and insert the elapsed time in the partial CDR. For example, charging data system 104 may identify a start timestamp for the session and may identify the last interim timestamp received prior to generating the partial CDR. Charging data system 104 may then calculate an elapsed time for the session based on the start timestamp and the last-received interim timestamp.

Charging data system 104 may insert other information in the partial CDR in addition to the duration information. For instance, charging data system 104 may insert a sequence identifier in the partial CDR. As an example, charging data system 104 may insert an identifier of "1" for the first partial CDR generated, may insert an identifier of "2" for the second partial CDR generated, may insert an identifier of "3" for the third partial CDR generated, etc. Charging data system 104 may also insert an indicator in the partial CDR that the present session is a long duration session. This may allow other downstream elements to react accordingly when the session is a long duration session.

In step 212, charging data system 104 transmits the partial CDR to correlation system 106. If charging data system 104 detects that the session has ended, then method 200 ends. If the session has not ended, then method 200 repeats at step 202 with charging data system 104 receiving interim accounting request messages from network element 102. Charging data system 104 identifies interim timestamps for the interim accounting request messages (step 204), and stores the interim timestamps (step 206).

Responsive to another triggering event, such as the session ending or the timer expiring again, charging data system 104 generates a second partial CDR (step 208), and inserts duration information in the second partial CDR. As described above for the duration information, charging data system 104 may calculate an updated elapsed time for the session and insert the updated elapsed time in the second partial CDR. For example, charging data system 104 may identify the start timestamp for the session and may identify the last interim timestamp received prior to generating the second partial CDR. Alternatively, charging data system 104 may identify the elapsed time previously calculated for the first partial CDR, and add the elapsed time calculated for the second partial CDR to the elapsed time calculated for the first partial CDR.

Method 200 continues until charging data system 104 receives a stop accounting request message from network element 102, or otherwise detects that the session has ended. Charging data system 104 then generates a final partial CDR for the session, and inserts the remaining duration information in the final partial CDR. Charging data system 104 then transmits the final partial CDR to correlation system 106.

Figure 3:
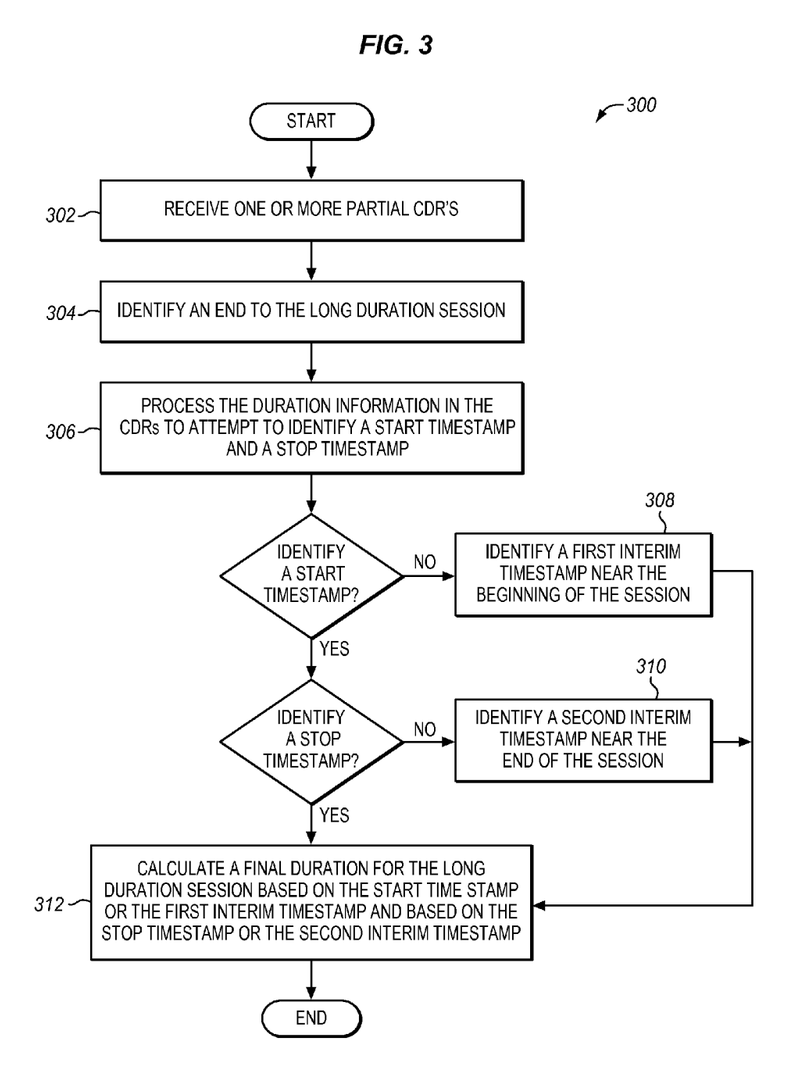
FIG. 3 is a flow chart illustrating a method of handling partial CDRs in an exemplary embodiment of the invention.

FIG. 3 is a flow chart illustrating a method 300 of handling partial CDRs in correlation system 106 in an exemplary embodiment of the invention. The steps of method 300 will be described with reference to communication network 100 in FIG. 1. The steps of the flow chart in FIG. 3 are not all inclusive and may include other steps not shown.

In step 302, correlation system 106 receives one or more partial CDRs for the long duration session from charging data system 104. In step 304, correlation system 106 identifies an end to the long duration session. In step 306, correlation system 106 processes the duration information from one or more of the partial CDRs to attempt to identify a start timestamp and a stop timestamp for the long duration session. If the start timestamp is not identified, then correlation system 106 identifies a first interim timestamp near the beginning of the long duration session in step 308. For instance, correlation system 106 may identify the earliest timestamp of the interim timestamps and assume that the earliest timestamp is nearer or nearest to the beginning of the session. If the stop timestamp is not identified, then correlation system 106 identifies a second interim timestamp near the end of the long duration session in step 310. For instance, correlation system 106 may identify the latest timestamp of the interim timestamps and assume that the latest timestamp is nearer or nearest to the end of the session. In step 312, correlation system 106 calculates a total duration for the long duration session based on the start timestamp or the first interim timestamp and based on the stop timestamp or the second interim timestamp. The terms "first" and "second" used above is not to define an order of the interim timestamps, but merely to distinguish one timestamp from another.

Communication network 100 as described above provides advantages over prior communication networks pertaining to charging for long duration sessions. As previously stated, present communication networks only generate start and stop timestamps for calculating the total duration for a long duration session. If one or both of these timestamps cannot be identified, then there is no charging for the session. Communication network 100 on the other hand generates interim timestamps in addition to the start and stop timestamps. Thus, if the start timestamp or the stop timestamps cannot be identified, one or more of the interim timestamps may be used to estimate the total duration for the session. The service provider can thus charge some estimated amount for the session instead of taking a total loss.

EXAMPLE

Figure 4:
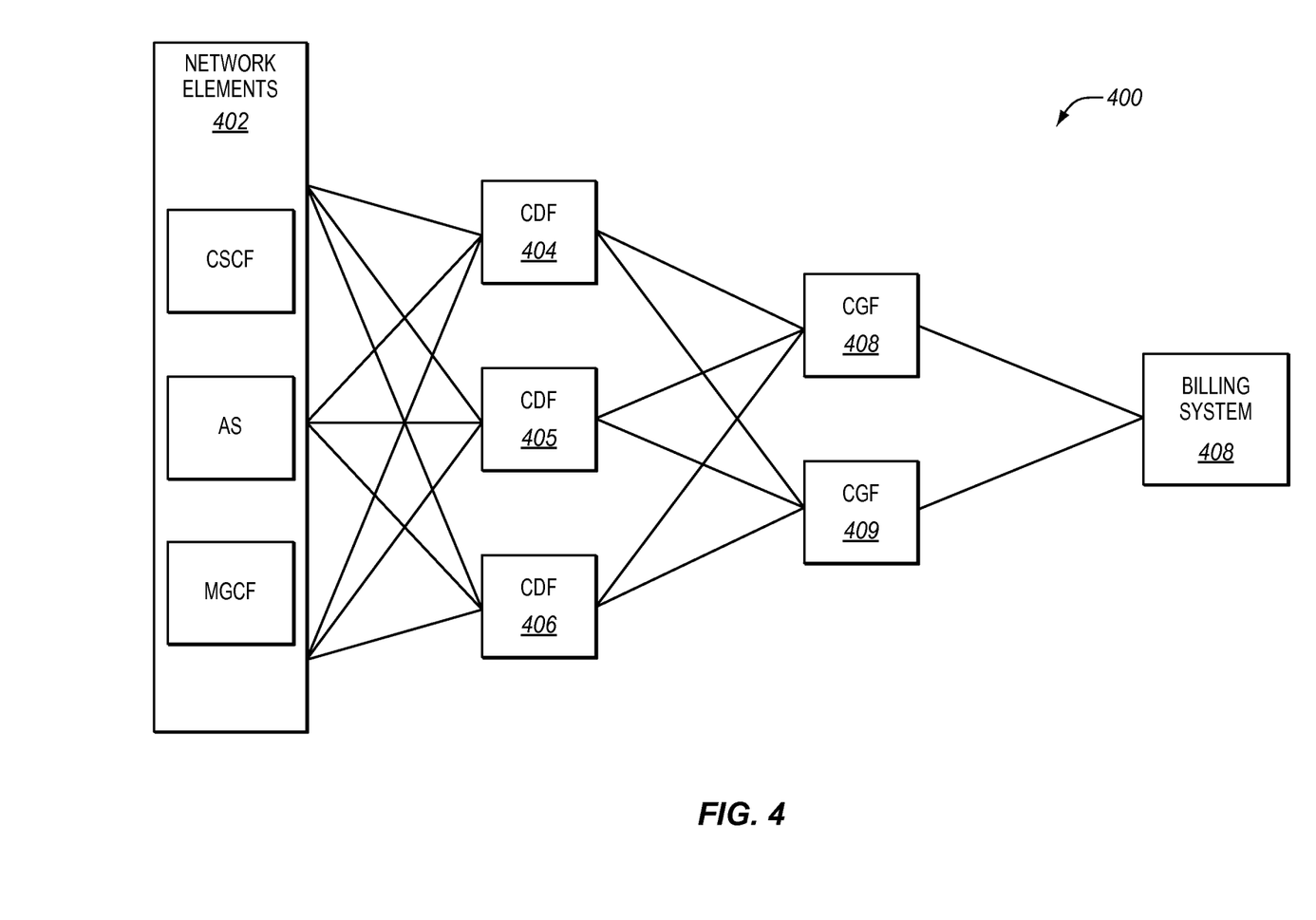
FIG. 4 illustrates another communication network in an exemplary embodiment of the invention.

FIG. 4 illustrates another communication network 400 in an exemplary embodiment of the invention. Communication network 400 includes an IMS domain represented by network elements 402. Network elements 402 may comprise a CSCF, an application server (AS), a Media Gateway Control Function (MGCF), or another of type element. Communication network 400 also includes an offline charging system represented by CDFs 404-406, CGFs 408-409, and billing system 410. When in operation, all IMS domain network elements 402 will send charging information via Diameter Rf messages to CDFs 404-406. The CDF cluster provides geo-redundancy. However, network elements 402 will ensure all Rf messages for one session arrive in one CDF. CDFs 404-406 are connected to CGFs 408-409 for redundancy. A CDF will ensure all CDRs for one session arrive in one CGF. This arrangement will make the CDR aggregation and correlation much easier at the CGF. The CGF may optionally correlate CDRs in one session based on the same ICID into one consolidated CDR which is sent to billing system 410 via Bx interface (FTP or secure FTP).

Assume for this embodiment that network element 402 is serving a session that is or will be a long duration session, such as a session lasting 70 hours. At the beginning of the session, such as responsive to receiving a SIP INVITE message for the session, a network element 402 generates a Diameter ACR(start) message. As previously described, an ACR message includes a field for a service delivery start timestamp and includes a field for a service delivery stop timestamp. Thus, network element 402 identifies a start time for the session, and inserts a start timestamp into the service delivery start timestamp field of the ACR(start) message. Network element 102 then transmits the ACR(start) message to one of CDF's 404-406 (assume CDF 404).

During the session, network element 402 periodically generates ACR(interim) messages. According to features and aspects provided herein, network element 402 identifies an interim time for the session and inserts an interim timestamp into a service delivery interim timestamp field of the ACR (interim) message. The service delivery interim timestamp field is a new field in the ACR(interim) message. Network element 402 then transmits the ACR(interim) message to CDF 404 according to the defined interval. Because this is a long duration session, network element 402 will transmit many ACR(interim) messages to CDF 404 each of which includes an interim timestamp.

CDF 404 receives the ACR(interim) messages from network element 402. CDF 404 is configured with a long duration session timer. If the session exceeds a predefined long duration session interval (such as 24 hours), then CDF 404 generates a partial CDR for the session. CDF 404 populates the CauseForRecordClosing=timeLimit (3) field in the partial CDR as defined by the standards. In addition, CDF 404 inserts a sequence identifier in the partial CDR which indicates the sequence of all partial CDRs.

When generating a partial CDR, CDF 404 calculates a present elapsed time for the session based on the earliest timestamp during the interval for this partial CDR and based on the latest timestamp. For example, for the partial CDR generated for the session, CDF 404 calculates the present elapsed time based on the start timestamp (if the start timestamp was received) and the latest interim timestamp. If the start timestamp was not received, then CDF 404 calculates the present elapsed time based on the earliest interim timestamp and the latest interim timestamp. Alternatively, CDF 404 may use an incremented elapsed time for each partial CDR generated. For instance, for a first partial CDR, CDF 404 may calculate a first elapsed time for the interval of the first partial CDR. For a second partial CDR, CDF 404 may calculate a second elapsed time and add that time to the first elapsed time to generate an incremented elapsed time. CDF 404 then inserts the present elapsed time for the session in the partial CDR and transmits the partial CDR to one of the CGF's 408-409 (such as CGF 408). CDF 404 also stores the present elapsed time, the ICID for the session, and one or more of the interim timestamps for the session.

The following illustrates an example of a 70 hour session. Network element 402 transmits an ACR(start) and ACR(interim) messages to the CDF 404. After the long duration session timer expires at 24 hours, CDF 404 generates a first partial CDR. CDF 404 calculates an elapsed time for this interval of the session based on the start timestamp in the ACR(start) message and the latest timestamp from the last-received ACR(interim) message. CDF 404 also identifies a prior elapsed time for the session (which is zero for the first partial CDR). CDF 404 then inserts the elapsed time for the first partial in a field of the first partial CDR, inserts the start timestamp for the session and the last received interim timestamp (and possibly other timestamps), and inserts the sequence identifier in the first partial CDR. CDF 404 also stores this information, such as in a database. For this session, CDF 404 may store a sequence identifier of "1", an elapsed time of 24 hours for the first partial CDR, a prior elapsed time of zero, and a latest interim timestamp of "12/12/2006 11:30 A.M.".

Assume now that CDF 404 fails or otherwise encounters a problem. Network element 402 then transmits ACR(interim) messages to CDF 405. CDF 405 receives an ACR(interim) message from network element 402 and detects that one or more ACR(interim) messages are missing. CDF 405 then checks the database using the ICID for the session as a key. CDF 405 identifies information for the first partial CDR that includes the prior elapsed time for the session and the last interim timestamp.

After the long duration session timer again expires at 24 hours in CDF 405, CDF 405 generates a second partial CDR for the session. CDF 405 calculates an elapsed time for this interval of the session. CDF 405 may have missed the first ACR(interim) message generated by network element 402 after the first partial CDR is generated. Thus, CDF 405 uses the latest interim timestamp stored for the first partial CDR and uses the latest received interim timestamp received from network element 402 to calculate an elapsed time for this interval of the session (24 hours). CDF 405 also identifies the prior elapsed time for the session as 24 hours. CDF 405 then inserts the elapsed time for this interval of the session in a field of the second partial CDR, inserts the latest received interim timestamp (and possibly other timestamps), and inserts the sequence identifier in the second partial CDR. CDF 405 also stores this information in the database. For this session, CDF 405 may store a sequence identifier of "2", an elapsed time of 24 hours for the second partial CDR, a prior elapsed time of 24 hours, and a latest interim timestamp of "12/13/2006 11:30 A.M.".

Assume now that CDF 404 is restored. Network element 402 continues to transmit ACR(interim) messages to CDF 404. When the session ends, network element 402 transmits an ACR(stop) message to CDF 404. CDF 404 generates a third partial CDR for the session. CDF 404 again calculates an elapsed time for this interval of the session. CDF 404 may have missed the first ACR(interim) message generated by network element 402 after the second partial CDR is generated. Thus, CDF 404 uses the latest interim timestamp stored for the second partial CDR and uses the end timestamp received from network element 402 to calculate an elapsed time for this interval of the session (22 hours). CDF 404 also identifies the prior elapsed time for the session as 48 hours. CDF 404 then inserts the elapsed time for this interval of the session in a field of the third partial CDR, inserts the end timestamp (and possibly other timestamps), and inserts the sequence identifier in the third partial CDR. CDF 404 also stores this information in the database. For this session, CDF 404 may store a sequence identifier of "3", an elapsed time of 22 hours for the third partial CDR, a prior elapsed time of 48 hours, and the end timestamp of "12/14/2006 9:30 A.M.".

CGF 408 then correlates the first partial CDR, the second partial CDR, and the third partial CDR based on the ICID for the session. CGF 408 then generates a final or consolidated CDR for the session, and transmits the final CDR to billing system 410 for charging.

By generating interim timestamps, CDF 404 is advantageously able to calculate a total duration for the session even though one or more of the ACR messages from network element 402 may have been missed. As a result, billing system 410 may be able to charge for the session.

Usually, session rating is based on a consolidated CDR with an entire session duration that is aggregated from individual partial CDR elapsed time. Rating may be a flat amount per pulse, or stepped rate (i.e., tariff changes along with elapse time). If a stepped rating applies to a partial CDR, then the present elapsed time field may be used to calculate the tariff. For example, when billing system 410 calculates the tariff for a particular session based on subscriber account information, calling and called party numbers, roaming and home zone conditions, etc., with stepped tariff as: the first hour with $0.10/pulse, $0.05/pulse for next 11 hours, $0.01/pulse for next 24 hours, and $0.10/pulse for additional hours, the stepped tariff for the session may calculated as indicated in Table 1.

TABLE 1

| Partial CDR | Elapsed Time | Prior Elapsed Time | Stepped Tariff |
| --- | --- | --- | --- |
| 1 | 24 Hours | 0 | $0.10/pulse for Hour 1<br>$0.05/pulse from Hour 2 to Hour 12<br>$0.01/pulse from Hour 13 to Hour 24 |
| 2 | 24 Hours | 24 Hours | $0.01/pulse from Hour 1 to Hour 12<br>$0.10/pulse from Hour 13 to Hour 24 |
| 3 | 22 Hours | 48 Hours | $0.10/pulse from Hour 1 to Hour 24 |

Each partial CDR may be rated independently and with the prior elapsed time considered in the stepped tariff calculation. The benefit of independent rating and billing is that if any partial CDR is missing, then the session may still be rated and billed and the service provider may secure at least portion of revenue. The prior elapsed time ensures a fair tariff to the subscriber when the stepped rating is applied in the long duration session.

CDF 404 generates partial CDRs using a configurable long duration session interval. Due to complexity of the network, such as network element and billing systems from multiple vendors, the interval setting for generating a partial CDR may not match with the maximum elapsed time setting in downstream devices or systems. For example, some billing systems 410 cannot accept a number exceeding 4 hours in the session duration field in the CDR, so CGF 408 has to reformat and produce multiple CDRs for a session exceeding 4 hours. As a result, there may be a need to synchronize and re-scale the elapsed time of the CDRs for the downstream devices or systems in the networks.

If a CDR correlation capability is turned on at CGF 408 to consolidate all partial CDRs (not only from one network element, but also from multiple network elements for one session) for a long duration session, the new consolidated CDR will have an elapsed time which is aggregated from all elapsed times in all partial CDRs. Then this CDR may need to be broken apart into multiple partial CDRs to meet the requirement of the new scale of maximum duration. The new partial CDRs contain ICID, sequence indicator, elapsed time, and prior elapsed time.

Assume for example that the long duration session interval in CDF 404 is set to 24 hours, and the maximum charging duration in billing system 410 is 4 hours. CGF 408 will reformat the partial CDRs from CDF 404 into a new set of partial CDRs with a new elapse time (new scale of interval of 4 hours). Thus, as is illustrated in Table 1, CGF 408 will reformat the first partial CDR into six new partial CDRs each having an elapsed time of 4 hours. The six new partial CDRs are each of the size that billing system 410 is able to process.

To re-format the partial CDRs, CGF 408 identifies a maximum charging duration supported by downstream billing elements, such as billing system 410. If the maximum charging duration is less than the elapsed time for the long duration session, then CGF 408 divides or splits the partial CDR into multiple partial CDRs each having an elapsed time value less than or equal to the maximum charging duration. The sum of the elapsed time values represented in the multiple partial CDRs equal the elapsed duration for the long duration session as calculated for the initial partial CDR.

Although specific embodiments were described herein, the scope of the invention is not limited to those specific embodiments. The scope of the invention is defined by the following claims and any equivalents thereof.

I claim:

1. An apparatus comprising:
a charging system adapted to receive interim accounting requests for a long duration session from a network element, to identify interim timestamps for the interim accounting requests, and to store the interim timestamps for use in charging for the long duration session.

2. The apparatus of claim 1 wherein:
the charging system is further adapted to generate at least one partial Charging Data Record (CDR) responsive to a triggering event, and to insert duration information for the long duration session in the partial CDR based on the stored interim timestamps.

3. The apparatus of claim 2 wherein:
the charging system is further adapted to identify an end to the long duration session, and to process the duration information from the partial CDR and other partial CDRs to attempt to identify a start timestamp and a stop timestamp for the long duration session;
if the start timestamp is not identified, then the charging system is further adapted to identify a first interim timestamp near the beginning of the long duration session, and to calculate a total duration for the long duration session based on the first interim timestamp and the stop timestamp.

4. The apparatus of claim 3 wherein:
if the stop timestamp is not identified, then the charging system is further adapted to identify a second interim timestamp near the end of the long duration session, and to calculate a total duration for the long duration session based on the start timestamp and the second interim timestamp.

5. The apparatus of claim 2 wherein:
the charging system is further adapted to receive at least the partial CDR, and to identify a maximum charging duration supported by downstream billing elements; and
if the maximum charging duration is less than an elapsed time for the long duration session, then the charging system is further adapted to divide the partial CDR into multiple partial CDRs each having an elapsed time value less than or equal to the maximum charging duration so that the sum of the elapsed time values represented in the multiple partial CDRs equals the elapsed time for the long duration session.

6. The apparatus of claim 2 wherein:
the charging system is further adapted to insert a sequence identifier in the partial CDR.

7. The apparatus of claim 1 wherein:
the charging system is further adapted to process the interim accounting requests to identify the interim timestamps inserted in the interim accounting requests by the network element.

8. The apparatus of claim 1 wherein:
the charging system is further adapted to identify the interim timestamps based on a local clock responsive to receipt of the interim accounting requests.

9. A method comprising:
receiving interim accounting requests for a long duration session in a charging system from a network element;
identifying interim timestamps for the interim accounting requests; and
storing the interim timestamps for use in charging for the long duration session.

10. The method of claim 9 further comprising:
generating at least one partial Charging Data Record (CDR) in the charging system responsive to a triggering event; and
inserting duration information for the long duration session based on the stored interim timestamps in the partial CDR.

11. The method of claim 10 further comprising:
identifying an end to the long duration session;
processing the duration information from the partial CDR and other partial CDRs to attempt to identify a start timestamp and a stop timestamp for the long duration session; and
if the start timestamp is not identified, then:
identifying a first interim timestamp near the beginning of the long duration session; and
calculating a total duration for the long duration session based on the first interim timestamp and the stop timestamp.

12. The method of claim 11 further comprising:
if the stop timestamp is not identified, then:
identifying a second interim timestamp near the end of the long duration session; and
calculating a total duration for the long duration session based on the start timestamp and the second interim timestamp.

13. The method of claim 10 further comprising:
receiving at least the partial CDR;
identifying a maximum charging duration supported by downstream billing elements; and
if the maximum charging duration is less than an elapsed time for the long duration session, then dividing the partial CDR into multiple partial CDRs each having an elapsed time value less than or equal to the maximum charging duration so that the sum of the elapsed time values represented in the multiple partial CDRs equals the elapsed time for the long duration session.

14. The method of claim 10 further comprising:
inserting a sequence identifier in the partial CDR.

15. The method of claim 9 wherein identifying interim timestamps for the interim accounting requests comprises:
processing the interim accounting requests to identify the interim timestamps inserted in the interim accounting requests by the network element.

16. The method of claim 9 wherein identifying interim timestamps for the interim accounting requests comprises:
identifying the interim timestamps based on a local clock in the charging system responsive to receipt of the interim accounting requests.

17. An apparatus comprising:
a network element adapted to generate a start accounting request for a session, to insert a start timestamp in the start accounting request, and to transmit the start accounting request to a charging system;
the network element further adapted to generate interim accounting requests for the session, to insert interim timestamps in the interim accounting requests, and to transmit the interim accounting requests to the charging system; and
the network element further adapted to generate a stop accounting request for the session, to insert a stop timestamp in the stop accounting request, and to transmit the stop accounting request to the charging system.

18. The apparatus of claim 17 wherein:
the network element is further adapted to insert the interim timestamps in a new field defined for the interim accounting requests.

19. The apparatus of claim 17 wherein:
the interim accounting requests comprise Diameter Accounting Requests (ACR); and
the network element is further adapted to insert the interim timestamps in a new field defined for Diameter ACRs.

20. The apparatus of claim 17 wherein:
the network element comprises a Serving-Call Session Control Function (S-CSCF) of an IP Multimedia Subsystem (IMS) network.

* * * * *